United States Patent
Shannon et al.

(10) Patent No.: US 8,818,760 B2
(45) Date of Patent: Aug. 26, 2014

(54) MODULAR RE-CONFIGURABLE PROFILING CORE FOR MULTIPROCESSOR SYSTEMS-ON-CHIP

(75) Inventors: Lesley Lorraine Shannon, Burnaby (CA); Alexandra Fedorova, Vancouver (CA)

(73) Assignee: Simon Fraser University, Burnaby (CA)

(*) Notice: Subject to any disclaimer, the term of this patent is extended or adjusted under 35 U.S.C. 154(b) by 601 days.

(21) Appl. No.: 12/916,413

(22) Filed: Oct. 29, 2010

(65) Prior Publication Data
US 2012/0022832 A1 Jan. 26, 2012

Related U.S. Application Data

(60) Provisional application No. 61/257,019, filed on Nov. 1, 2009.

(30) Foreign Application Priority Data

Feb. 26, 2010 (CA) ..................................... 2695564

(51) Int. Cl.
- *H03F 1/26* (2006.01)
- *G06F 19/00* (2011.01)
- *G06F 11/00* (2006.01)
- *G06F 11/34* (2006.01)

(52) U.S. Cl.
CPC .......... *G06F 11/348* (2013.01); *G06F 2201/88* (2013.01); *G06F 11/3404* (2013.01); *G06F 11/3409* (2013.01)
USPC ........................... 702/189; 700/108; 714/47.1

(58) Field of Classification Search
USPC ............... 702/189, 57, 81, 84, 108, 117–120, 702/122, 127, 182–183, 186; 700/95–97, 700/108–109; 714/1, 47.1
See application file for complete search history.

(56) References Cited

PUBLICATIONS

Shannon et al., Using Reconfigurability to Achieve Real-Time Profiling for Hardware/Software Codesign, Feb. 22-24, 2004, FPGA'04, Monterey, California, pp. 190-199.*

Tong et al., Profiling Tools for FPGA-Based Embedded Systems: Survey and Quantitative Comparison, Jun. 2008, Journal of Computers, vol. 3, No. 6, 14 pp.*

Eric Matthews, Sean Edmond, Lesley Shannon and Alexandra Fedorova, "ABACUS", research publication, Oct. 30, 2009, 35 pages, revision 2.1, Simon Fraser University, Vancouver, British Columbia, Canada.

(Continued)

*Primary Examiner* — Toan Le
(74) *Attorney, Agent, or Firm* — Dean Palmer IP Law/IProperty Inc.

(57) ABSTRACT

A modular dynamically re-configurable profiling core may be used to provide both operating systems and applications with detailed information about run time performance bottlenecks and may enable them to address these bottlenecks via scheduling or dynamic compilation. As a result, application software may be able to better leverage the intrinsic nature of the multi-core hardware platform, be it homogeneous or heterogeneous. The profiling functionality may be desirably isolated on a discrete, separate and modular profiling core, which may be referred to as a configurable profiler (CP). The modular configurable profiling core may facilitate inclusion of rich profiling functionality into new processors via modular reuse of the inventive CP. The modular configurable profiling core may improve a customer's experience and productivity when used in conjunction with commercial multi-core processors.

24 Claims, 13 Drawing Sheets

(56) References Cited

PUBLICATIONS

Eric Matthews, Lesley Shannon, Sergey Blagodurov, Sergey Zhuralev and Alexandra Fedorova, "ABACUS: A Hardware-Based Software Profiler for Modern Processors", conference presentation at Architectural Support for Programming Languages and Operating Systems, Pittsburgh, PA, Mar. 15, 2010, 42 pages, Simon Fraser University, Vancouver, British Columbia, Canada.

* cited by examiner

500

Type 1: CALL

Type 2: BRANCHES & SETHI

Type 3: ARTHIMETIC & MEMORY & OTHER

700

MODULAR RE-CONFIGURABLE PROFILING CORE FOR MULTIPROCESSOR SYSTEMS-ON-CHIP

FIELD OF THE INVENTION

The present invention relates generally to computer processor performance profiling systems. More particularly, the present invention relates to modular re-configurable discrete profiling core systems for computer processors.

BACKGROUND TO THE INVENTION

For years, processor designers were able to fully leverage Moore's Law, which states that the density of components integrated on a single chip grows exponentially over time. In conjunction with increasing chip density, chip clock rates have previously been following a trend of doubling approximately every 18 months. However, due to the increasing power requirements of processors, this clock frequency scaling is no longer possible. Instead, processor manufacturers have moved to designing multi-core processor systems, leveraging increasing chip density and possible spatial parallelism while clock rates remain relatively constant. It is predicted that the number of processors in multi-core systems will eventually scale to the 10 s and 100 s. This becomes a significant challenge for the Operating System (OS), which has to determine how to schedule tasks effectively on these complex systems. How will the OS determine how to schedule threads so as to minimize cache contention and which processor(s) meet each task's execution requirements on heterogeneous systems?

Currently a number of hardware counters are included as part of a processor's architecture that enable limited profiling of applications at run time. However, these do not provide sufficient flexibility or information to effectively guide the OS in task assignment. While existing counters report the symptoms of a problem (i.e., how large the cache miss rate is), they do not provide insight into why the problem has occurred and how it could be fixed.

Recent advances in integrated circuit technology have opened the door to very complex computation platforms. These platforms provide the high performance needed for both existing and many emerging applications. Many of these platforms contain multiple processors on a single chip. These modern multicore processors, also known as Multi-Processor Systems-on-Chip (MPSoC), contain multiple processing units sharing the caches and bus/point-to-point interconnects. This intimate sharing of resources among the cores leads to many opportunities for performance optimizations through co-operative sharing of resources, but also may cause performance degradation through shared resource contention. Since the introduction of multicore architectures into mainstream computing, much research effort has been dedicated to finding means for exploiting these opportunities and eliminating the problems. The challenge in these endeavours is that different workloads (programs running on the computer) have very different properties, meaning the resource management policy must also depend on the workload. To that end, researchers have strived for improved observability into performance on multicore processors.

Existing observability tools, such as simple hardware performance counters, do not give enough information to address these issues, and so as a result, many proposals for more complex hardware counter architectures have emerged. These new architectures were a significant improvement over the existing state-of-the-art in that they allowed profound understanding of the properties of workloads and their interactions with multicore hardware. Unfortunately, their implementation in real processors required modifications to the processors underlying operation and architecture, and this proved to be a barrier for bringing these fruitful ideas to real devices. Many of the proposals for new observability enhancements remain research prototypes.

BRIEF SUMMARY

It is an object of the present invention to provide a discrete configurable profiling core system that addresses some of the limitations of the prior art.

According to one embodiment of the present invention, a computer system comprising at least one non-configurable hard processor (also well known in the art as a "hard processor" or a "processor" in contrast to a "soft processor" or "reconfigurable processor") with at least one non-configurable hard processor core (also well known in the art as a "hard processor core" or a "processor core" in contrast to a "soft processor core" or "reconfigurable processor core") is provided, where the computer system further comprises at least one discrete profiling core separate from the at least one processor, and wherein the at least one discrete profiling core comprises:

at least one processor interface module operable to receive processing signals from the at least one non-configurable hard processor core; and at least one profiling module operable to analyze at least a portion of the processing signals to profile at least one processing performance measure; and wherein the at least one profiling core is operable to be configured during operation.

According to another embodiment, a configurable profiling core is provided for use in a computer system comprising at least one non-configurable hard processor (also well known in the art as a "hard processor" or a "processor" in contrast to a "soft processor" or "reconfigurable processor") separate from the configurable profiling core and having at least one non-configurable hard processor core (also well known in the art as a "hard processor core" or a "processor core" in contrast to a "soft processor core" or "reconfigurable processor core"), wherein the configurable profiling core comprises:

at least one processor interface module operable to receive processing signals from at least one non-configurable hard processor core; and at least one profiling module operable to analyze at least a portion of the processing signals to profile at least one processing performance measure; wherein the profiling core is operable to be configured during operation.

According to another embodiment of the present invention, a modular dynamically re-configurable profiling core is provided which may be used to provide both operating systems and applications with detailed information about run time performance bottlenecks and may enable them to address these bottlenecks via scheduling or dynamic compilation. As a result, application software may be able to better leverage the intrinsic nature of the multi-core hardware platform, be it homogeneous or heterogeneous. In one embodiment, the profiling functionality may be desirably isolated on a discrete, separate and modular profiling core, which may be referred to as a configurable profiler (CP). In another embodiment, this modular configurable profiling core may facilitate inclusion of rich profiling functionality into new processors via modular reuse of the inventive CP. According to a further embodiment of the invention, the incorporation of the modular configurable profiling core may improve a customer's experience and productivity when used in conjunction with commercial multi-core processors.

In one embodiment of the present invention, it is an object to provide designers with observability of tasks executing on heterogeneous multicore systems at run time to understand how to best leverage the processing resources of the system. In another embodiment, it is an object to provide operating system scheduling algorithms that leverage detailed run time statistics of applications to determine which processor(s) meet their execution requirements on heterogeneous multi-core systems, and how to map applications to cores on systems with shared caches/memory so as to minimize cache/memory contention. In a further embodiment, it is an object for a performance profiling system incorporating a configurable profiling core to provide interpreted and/or guided processor performance profile information to designers comprising recommendations on how to optimize applications running on multicore processor systems.

BRIEF DESCRIPTION OF THE DRAWINGS

The modular reconfigurable profiling core and associated systems of the present invention will now be described with reference to the accompanying drawing figures in which.

DETAILED DESCRIPTION OF SEVERAL EMBODIMENTS

Figure 1:
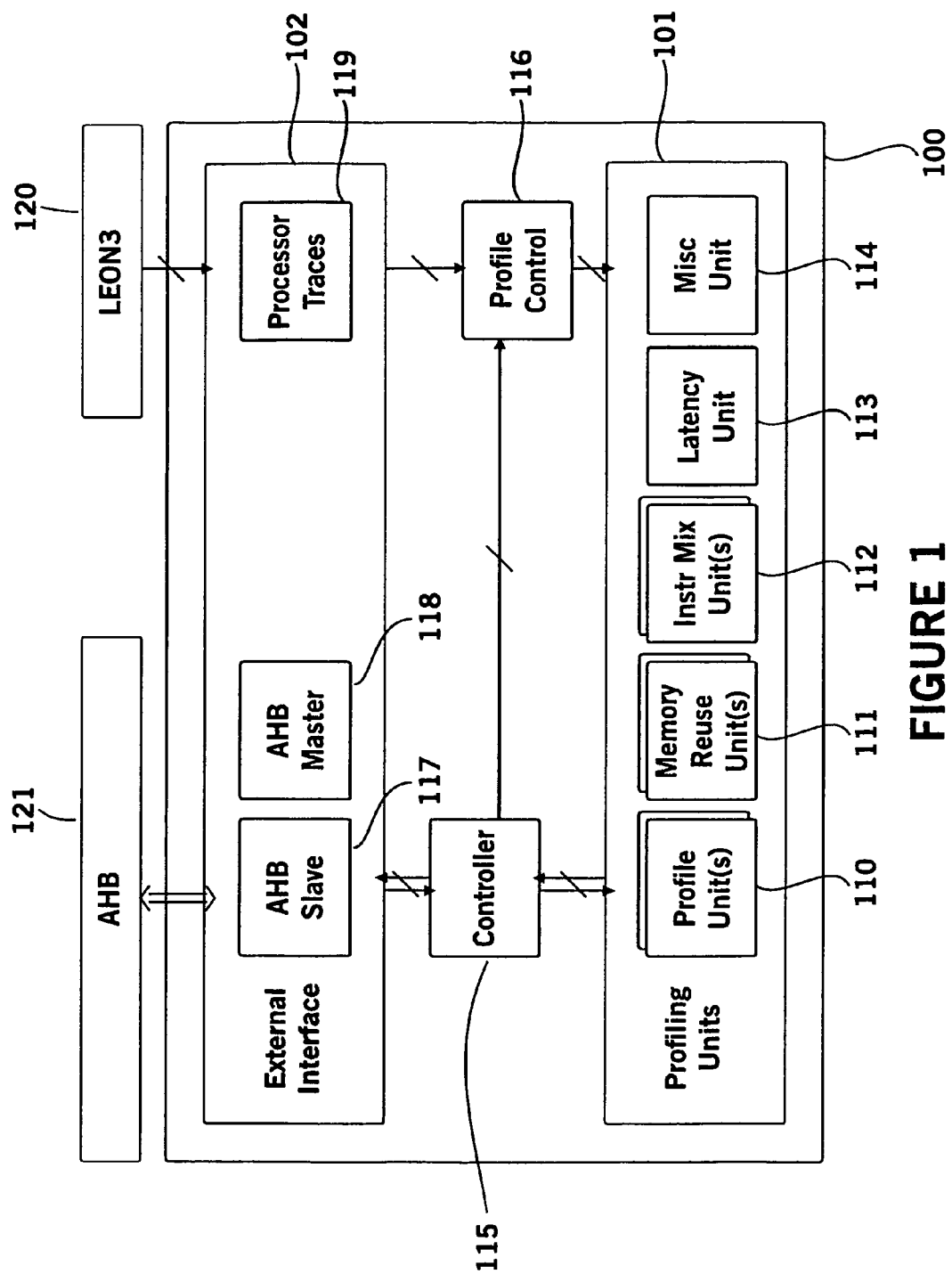
FIG. 1 illustrates an overview schematic representation of a configurable profiling core according to an embodiment of the present invention.

Exemplary embodiments of the present invention are described below with reference to the Figures of the drawings. It is intended that the embodiments and Figures disclosed herein are to be considered illustrative rather than restrictive.

According to several embodiments of the present invention it is proposed to design, implement, and evaluate a new configurable profiler (CP) core architecture, and in particular, a configurable profiler core which is modular, and may be dynamically re-configured during runtime. The CP core may be provided as a separate core on a chip multiprocessor that may be dedicated specifically for online performance profiling. In order to get useful and fine-grain information about runtime events, the CP core may be communicatively connected to the main (general-purpose) non-configurable hard processor (also well known in the art as a "hard processor" or a "processor" in contrast to a "soft processor" or "reconfigurable processor") core (or cores), such as by via a small set of connectors that act as virtual probes. This connection, such as by virtual probes, may enable the CP core to obtain vital statistics about performance on MPSoCs, such as cache reuse patterns (a.k.a. stack distance profiles), the degree of cache sharing among the threads, instruction mix, among others. To minimize the silicon area required for the CP core, it may be configurable at runtime allowing the OS and user applications to select what aspects of the application's behaviour they wish to monitor.

In a further embodiment, the CP core may be dynamically re-configurable during runtime, allowing the OS and user applications to dynamically change which aspects of the application's behaviour is monitored during execution. As an exemplary embodiment, the CP core may be prototyped on a multi-FPGA platform to monitor a multi-threaded multicore central processing unit (CPU). In one aspect of the present invention, the modular and configurable architecture of the present inventive CP core provides for observability into general-purpose multicore processors.

Further, according to one embodiment, the CP core's modularity provides a practical way to integrate a CP into modern multi-core processors. Without such modularity, each processor manufacturer would have to modify each new multiprocessor architecture to include the hardware counters desired by application developers. Since this incurs a cost and delays time-to-market, it is likely that the more ambitious and potentially useful counter architectures may never be incorporated. Furthermore, since the processor chip real estate is limited, the hardware manufacturer may not be able or willing to include many of the specific performance counters proposed by the research community. However, according to an embodiment of the present invention, in a system incorporating the CP core, the profiler may be encapsulated in a separate profiling core, and may be implemented in conventional processor hardware by connecting the general purpose cores to the CP core (or cores) through any suitable well-defined interface. This may accelerate the hardware design process and allow for reuse of a library of processor event types for which the CP core monitor may be used, and profiling components for any subset of those event types may be instantiated at fabrication of the processor. This may desirably result in a decreased time-to-market for companies employing multicore processors with the CP core according to an embodiment of the invention in their system. Examples of statistics that may be monitored by the CP core in one embodiment of the invention may include: code segment execution time, instruction mix, and cache access patterns (e.g., stack distance profile).

According to one embodiment of the present invention, a modular re-configurable profiler core provides isolated profiling functionality for a multiprocessor in a separate core which is distinct from the general purpose processor cores. In doing so, integration of advanced profiling capabilities into modern multicore processors may be facilitated. A CP core according to an embodiment of the present invention may support a variety of performance monitoring features in a compact design. Preferably, such a CP core may also incorporate an appropriate sampling methodology so that the CP core can keep up with the rate of events generated by the main processor(s), and the number of signals to be monitored, while providing for re-configurability of the CP.

Another embodiment of the present invention provides for a generic interface for the probes from the CP core to the processor(s) to be monitored. In one embodiment, the CP may desirably be flexible to provide for integration with a variety of modern processors, and stable such that the design of the CP does not need to be changed with each new processor model, to provide for modularity of the CP. In such an embodiment, desirably only the bus slave interface for the modular re-configurable profiler core may have to be updated for integration with different processor families. An embodiment of the present invention also provides for mapping of the CP core configuration and responses to the OS and/or software application(s) running on a computer, to abstract the CP hardware from the user. A further embodiment provides for additional resource management algorithms (in the operating system or at a user or software application level) that may use the profiling information obtained by the CP core from the general purpose processor(s) and provided to such algorithms, for example. Desirably, such embodiments may enable the effective and efficient use of all available processing resources in modern complex computer processor systems, which may provide for increased processing throughput and overall usability of the system for programmers.

Embodiments of the present invention may be applied to desirably improve the performance of applications on multicore processors. As described earlier, previously this effort has been limited by poor observability into the performance of multicore processors. A concrete example of one of the most difficult issues to address on multicore processors is cache sharing. Cache sharing can be co-operative, where co-running threads benefit from cache sharing by pre-fetching data for one another, or destructive, where co-running threads displace one another's working sets. While existing performance counter architectures can tell how a thread performs in the cache (i.e., the cache access rate and miss rate), they may not reveal why the cache miss rate is such and not lower. Without the availability of hardware counters allowing accurate estimates of cache contention, previous approaches have used analytical modelling based on potentially inaccurate data from existing counters. As a result, the previously available scheduling algorithms may be more complicated and less precise than they could be if the counters for stack-distance were available. Stack-distance counters may also be used to decide how to partition cache among co-running applications (on systems that allow such partitioning). Therefore, in one embodiment of the present invention, the capability to collect stack-distance profiles in the CP core is provided, to allow the design of OS scheduling algorithms that use the information provided by these counters to minimize cache contention. Another performance issue related to cache sharing applies to threads that share data. Threads sharing data may perform better if they are co-scheduled on cores that share a cache, because they pre-fetch data for each other and may experience lower communication latencies. In an embodiment of the present invention, the CP core may be operable to detect sharing among threads by monitoring cache coherency traffic by integrating such profiling functionality into the CP core. Therefore, in such an embodiment, the operating system may be able to co-schedule threads for optimal cache sharing on any processor that includes a CP core according to the present invention.

Another embodiment of the invention is directed to asymmetric multicore processors (AMP), which may combine many simple in-order cores as well as several complex out-of-order cores, all exposing the same instruction set architecture (ISA). Such AMP processors (which may not yet be manufactured, but proposed for the future) may deliver higher performance per watt than their symmetric counterparts. However, performance asymmetry may also be present on processors that were not designed to be asymmetric but where core frequency may vary due to variation in the fabrication process. In order to best utilize AMPs, the operating system scheduler may match threads to cores in consideration of characteristics of both. For example, in a multi-program workload consisting of applications with various degrees of instruction-level parallelism (ILP), it is reasonable to map high-ILP applications to fast out-of-order cores (optimized to extract the ILP) while mapping low-ILP applications to simple in-order cores. In one embodiment, the operating system may construct an architectural signature of each thread, which contains information similar to a stack-distance profile, and enables estimating the relative benefit for each thread on each type of core dynamically during runtime, so that the dynamically updated architectural signature may adapt to the changes in the program's phases or to different inputs and may be used to adapt processor scheduling for workloads with dynamic phases and unpredictable inputs.

In another embodiment, the processor profiling data obtained by the modular re-configurable profiler core may be used for applications other than improving the computational performance and/or efficiency of a multi-processor system. In one exemplary embodiment, the profiling data collected by the CP core may be used to control and desirably to enhance power consumption performance of the system, such as to determine and schedule processing tasks so as to reduce power consumption of the system, or to improve computational efficiency (e.g. performance per watt) of the system. Such applications of the inventive CP core may be of particular interest in the field of mobile computer systems, such as to enable reduce power consumption and improve performance and battery life, for example.

According to another embodiment of the invention, the real estate on a processor die required for the implementation of the CP core may be desirably reduced so that the CP core is not so large that the loss of these resources from the processing system may be more significant than any runtime behavioural statistics the CP core can provide to the operating system task scheduler. Accordingly, in one such embodiment, the CP core may be clocked at a lower frequency and use sampling to obtain the desired profiling statistics which may desirably use sampling to obtain results that are valid and at least similar in accuracy to non-sampled precise data (at least for stack-distance profiles for example).

In a further embodiment of the present invention, the CP core may be subdivided into at least two exemplary modules: a statistics generator/recorder module, or statistics module, and a system-probe/slave interface, or system interface module. The system interface module may comprise the architecture-specific portions of the modular re-configurable profiler, which may be adapted to integrate with whichever processor(s) are to be monitored, due in part to the uniqueness of the signals available in a processor's architecture for probing by the inventive CP core. In one embodiment, the CP core may also be included as an additional slave device in the microprocessor system to enable the OS to configure and collect data from the CP core, which requires the system interface module of the CP core to also support the appropriate bus protocols for that given system. In such an embodiment, a device driver may be provided to enable the configuration (either before runtime, or re-configuration during runtime) and data collection from the CP core. In one embodiment, the CP core may desirably include a profiler memory in which at least a portion of the profiling data monitored by the CP core may be stored, such as a dedicated and/or integrated profiler random access memory (RAM). In such case, Direct Memory Access (DMA) support may be provided for the profiler, to provide access by the OS to the profiler memory and the profiling data stored therein. A generic OS interface (e.g. OS page) may also desirably be provided in one embodiment, for communicating data from the CP core to the OS scheduler. The statistics module of the CP core may desirably be a scalable architecture, such as consisting of different subcomponents that can be included to generate and record a variety of run time information about the system.

According to another embodiment of the present invention, a modular re-configurable profiler core is provided wherein the profiling functionality, including all processor event counters, may be isolated in a separate profiling core as opposed to built inside or associated with an existing processor core. Such modular re-configurable profiler core may preferably be a separate unit, which may attach to the main processor core (or cores) via a suitable well-defined interface (i.e., wires and signals). According to such an embodiment, the event counters of the profiler core may be developed and tested separately from the main processor core(s), thus preferably making the chip design process more modular. Further, the profiling core may preferably also have its own memory, and thus it may be able to provide richer information about the monitored events in the multi-core processor. Additionally, the profiler core may preferably be more portable than existing counters which may be integrated with or built into main processor cores, because the profiler core may connect to the main processor core(s) via a suitable well defined interface, rather than requiring changes to microarchitecture of the processor to design or incorporate specific types or numbers of counters, for example.

ABACUS Embodiments of the Invention

According to several further embodiments of the present invention, a modular re-configurable profiler core system according to the present invention is provided, and is referred to as ABACUS (hArdware Based Analyzer for Characterization of User Software). In the following embodiments, the following terms are given the meanings described below:

GLOSSARY

ABACUS: hArdware Based Analyzer for Characterization of User Software.
AHB: Advanced High-performance Bus
AMBA: Advanced Microcontroller Bus Architecture
APB: Advanced Peripheral Bus.
CR: Command Register.
DDR: Double Data Rate.
DMA: Direct Memory Access.
DMABR: DMA Base Register.
DMACR: DMA Configuration Register.
DSU: Debug Support Unit.
IPC: Instructions per Cycle.
IRQ: Interrupt Request.
LEON3: An exemplary open source SPARC™ V8 computer processor.
LRU: Least Recently Resently Used.
PC: Program Counter.
SR: Status Register.
UART: Universal Asynchronous Receiver/Transmitter.
XUP: Xilinx™ University Program.
FPGA: Field Programmable Gate Array.
FPU: Floating Point Unit.
I/D Cache: Instruction/Data Cache.
RAM: Random Access Memory.

Throughout the following description of several embodiments, a modular re-configurable profiler core referred to as ABACUS may also be referred to as "device". In addition, in the following embodiments, the term "unit" may be used to refer to any profiling core employed by ABACUS according to an embodiment of the invention.

Motivation

According to one embodiment, ABACUS may comprise a profiling core adapted to monitor certain metrics useful for characterizing software performance on a processor system during run-time.

Structure Overview of Configurable Profiling Core 100

An overview schematic representation of a configurable profiling core 100 according to an embodiment of the present invention and referred to as ABACUS 100 is shown in FIG. 1. In one embodiment, ABACUS 100 is structured to be modular in design. At a basic level it may consist of a collection of profiling units or modules 101—the basic blocks that collect the various performance metrics, such as instruction mix 112, memory reuse distance 111, latency 113, Cycle profiling 110, and other additional units 114, such as Instructions per Cycle (IPC). As a layer of control over the basic profiling units 101 a range control unit (e.g. profile control 116) may be provided that can optionally limit the address range over which the device profiles. The device 100 may include a controller 115 to allow software control and access of counter data through the bus interface (e.g. external interface 102).

Profiling Units 101

Each modular reconfigurable profiling unit 101 according to an embodiment of the invention may receive various signals from the non-configurable hard processor (also well known in the art as a "hard processor" or a "processor" in contrast to a "soft processor" or "reconfigurable processor") (e.g. processor 120) in order to create their metrics. They may comprise some simple logic, to convert the collected data into the desired metric and a collection of counters in which to store the data. A counter may include a collection of hardware registers with an incrementer attached (see FIG. 5, for example). The default size of the counters in ABACUS 100 may be 48 bits according to one embodiment. How many counters the profiler core 100 may contain and how significant the additional logic is may be varied depending on the metric being collected.

Configurability

The easily adaptable design of ABACUS 100 may support the addition of more profiler units 101, and existing units 101 may be modified to allow for more complex capabilities in one embodiment. Where possible, ABACUS 100 has been designed using generic parameters. As such, the addition of more profiling cores, or more complex capabilities of existing cores may not require significant redesign. According to an embodiment, ABACUS 100 may preferably not be platform specific, but may provide a modular and widely compatible structure. In one embodiment, the CP device 100 configuration may include the following features and capabilities necessary for operation with a particular processor or type of processors, such as the LEON3 processor 120. In another embodiment, the profiler core 100 infrastructure may support multi-issue processors, for example. In one embodiment, at the hardware configurability level ABACUS 100 may allow the following parameters to be altered:
Top Level Parameters
Hardware-Instantiation-Time Parameters

TABLE 1.4.1

ABACUS Generics

| Generic | Allowed Range |
|---|---|
| Instruction Cache set-associativity | 2 to 8 |
| Data Cache set-associativity | 2 to 8 |
| Data Cache Latency Signals | 1 to 8 |
| Number of Trace units | 0 to 16 |
| Number of overlapping range units | 0 to 16 |
| Number of non-overlapping range units | 0 to 16 |
| Number of Instruction types | 0 to 16 |

TABLE 1.4.2

ABACUS Constants

| Constant | Value (bits) |
|---|---|
| Counter Size | 48 |
| Unit Address Width | 4 |
| Counter Address Width | 4 |
| PC Width | 30 |

Figure 2:
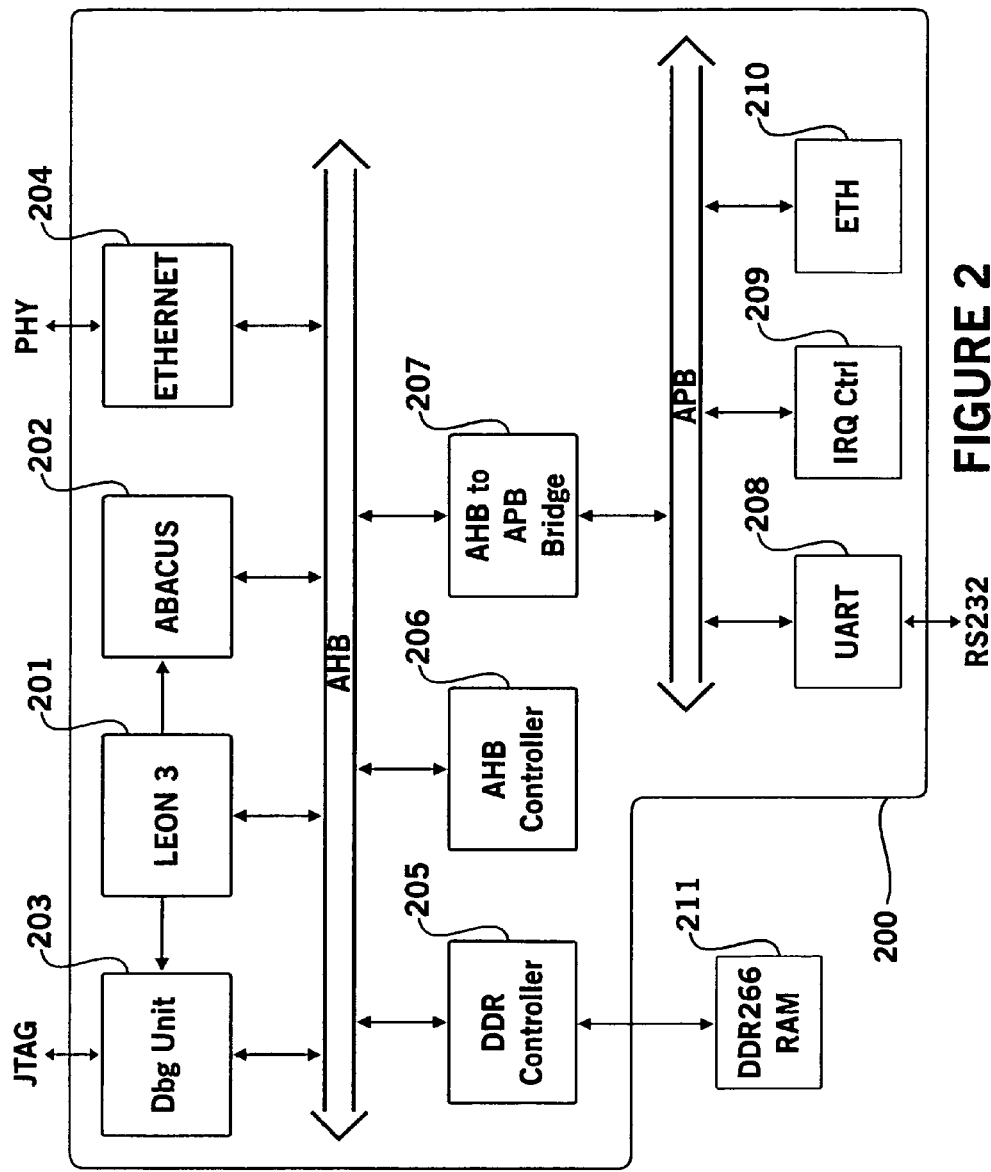
FIG. 2 illustrates a schematic representation of a multicore processor computer system comprising a configurable profiling core according to another embodiment of the present invention.
Figure 3:
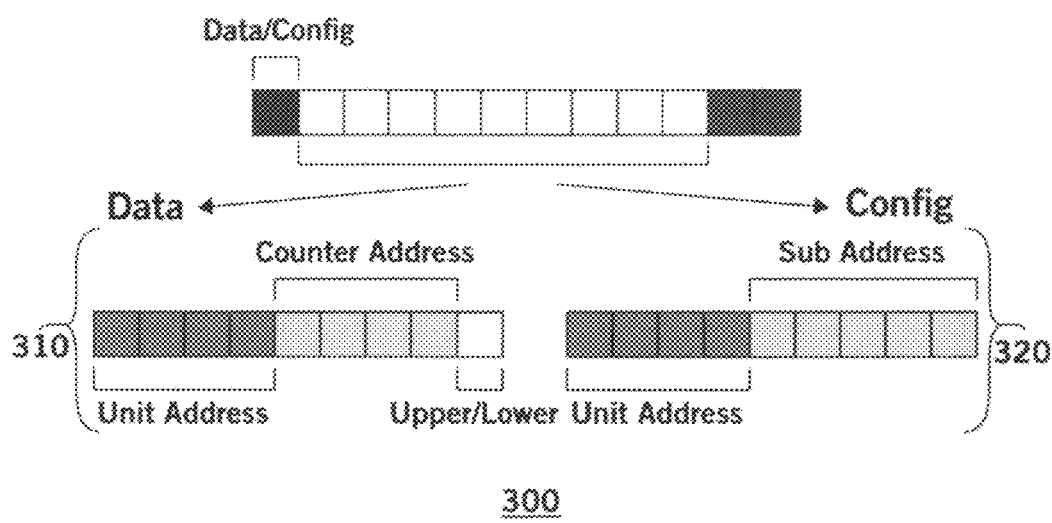
FIG. 3 illustrates a graphical representation of a potential data address partitioning scheme implemented by a configurable profiling core according to a further embodiment of the present invention.

In another embodiment, the addition/removal of profiling units 101 may be made more configurable. Configuration flags may be provided for the number of desired Memory Reuse 111, Profile 110, and Instruction Mix 111 units, and whether to include the misc. unit 114. Each unit's position in the address space may change depending on the number of other units placed before it. Units 101 such as the profile 110 and instruction mix 112 units, may share the same processor trace inputs 119, while for memory reuse 111 the processor inputs may be hardcoded, meaning adding additional memory reuse units may require changing the top level ports of ABACUS 100.
Run-Time Parameters
Instruction Mix Classification
Profile Address pairs (for range and trace profiling, for example)
Profile Mode
Test System 200
According to one embodiment, a CP core (e.g. CP core 100) demonstrating the invention was tested using a test system based on a LEON 3 synthesizable processor model [3] [4]. A schematic representation of a multicore processor computer system 200 comprising a LEON 3 processor 201 model and having a configurable profiling core 202, similar to CP core 100, according to an embodiment of the present invention is shown in FIG. 2. Characteristics of the exemplary such test system embodiment included:
Advantages of LEON 3
Open Source (GPL2 License)
Frequent updates
Support available through leon_sparc yahoo group
Highly reconfigurable
Has MMU
Can control Instruction and Data cache set-associativity
Can include optional hardware multiply and divide units
Can include optional floating point unit
Disadvantages of LEON 3
Quite large (>80% of V2P30 slices for a full system)
Low operating frequency on V2P30 FPGA of 50 MHz
Different toolset (e.g. GRMON)
Debug software not open source
In such an embodiment, a Xilinx XUP V2P FPGA test board [1] was used. The configuration of the system was kept simple to reduce FPGA resource usage and help with meeting timing requirements.
LEON3 Configuration
MMU enabled
Gaisler FPU-lite (non-pipelined)
I/D Cache LRU replacement and 2 way set-associative
Hardware multiply
System Peripherals
ABACUS 202
Debug Unit 203
Double Data Rate (DDR) Controller 205
Ethernet 204
Advanced High-performance Bus (AHB) to Advanced Peripheral Bus (APB)
Bridge 207
AHB Controller 206
Interrupt ReQuest (IRQ) controller 209
Timer unit (ETH) 210
Universal Asynchronous Receiver/Transmitter (UART) 208
Operation Overview
An overview of the operation of an exemplary ABACUS modular re-configurable profiler core according to an embodiment of the invention is detailed below to illustrate an embodiment of the invention.
Address Space 300
In one embodiment, such as one shown in FIG. 1, ABACUS 100 may interface with the rest of the system through the Advanced Microcontroller Bus Architecture (AMBA) AHB bus 121 and may comprise both a Master 118 and Slave 117 connection to the bus 121. The slave 117 may facilitate reading counters and reading/writing configuration data to ABACUS 100, and the master 117, may perform Direct Memory Access (DMA) for reading the counters in a single operation.
The device 100's address space 300 may partitioned as shown in FIG. 3, in which a graphical representation of a data address 300 partitioning scheme implemented by a configurable profiling core (e.g. CP core 100) according to an embodiment of the present invention is illustrated. The most significant bit may be used to select between the data address space 310 and the configuration address space 320.
From here the two sub address spaces 310 and 320 may be treated differently. In one embodiment, for the counter data the sub address space may be split into a 4 bit unit address, 4 bit counter address and 1 bit upper or lower 32 bit counter value. The upper/lower select bit may be a consequence of the 32 bit bus width. This subdivision may allow for up to 16 profiling units and up to 16 counters per unit.
For the configuration space there may also be a 4 bit unit address. However, this unit address may not necessarily map to the same units as the data unit address. The reason for this is that not all units may have run-time configuration data and those that do not may not be mapped to an address range in order to reduce the logic required. The next 5 bits are the sub address for configuration allowing each unit up to 32, 32-bit registers of memory space. In addition the controller and its associated registers may be mapped to the first unit address in the configuration space.

By partitioning the address space in terms of profiling units, a system with a sparsely populated address space may be created. Most units do not fill their assigned address space with counters and some units may have no configuration data, thus we a much larger address space than is actually required may be used.

Bus Interface

Slave Read

In one embodiment, the slave read interface may be used to read the configuration registers and do single reads for counter values. The slave interface may not prefetch data and thus may not be suitable for large data access. For performing a complete read of the device's address space a DMA transfer may be initiated.

Slave Write

The slave write interface may be used to write to the configuration registers in order to initiate DMA access, start/stop profiling and/or reset the device. Writing to the Command Register (CR) may also change the profile mode of the device.

Master Write

The master interface may be used for DMA write transactions. A DMA write operation may be used to write out the counter values to memory in a large block to improve system performance.

Controller

The ABACUS controller (as shown in FIG. 1) may be used to drive the execution of the device, allow user control, and enable the device to transition between different states.

Essentially, the controller may be the primary interface between the bus' slave and master interfaces and the logic that controls profiling. In one embodiment, the controller may be responsible for the following functionality:

Configuring the device with user specified run-time parameters

Reading counter values from the device (in DMA mode)

Starting and stopping profiling

Interfacing with the master to perform DMA operations

Interfacing with the slave to read/write to registers

Asserting interrupts to notify the OS of completed operations or errors

Resetting the device

Changing the profile mode of the device

All changes in state may typically require some form of user interaction. Transitions between states may be triggered via writing a valid command to the CR, or automatically upon completion of a user initiated task (eg. DMA write) or if an error occurs. The controller may tie intimately into the system, such as connecting to the AHB master and slave interfaces. Furthermore, the controller may connect to the ABACUS user logic unit such as to control the profiling units and configuration of the device.

Controller Configuration Registers

In one embodiment, the device may contain four special registers for controlling and monitoring its operation. These registers may comprise: the CR, the Status Register (SR), the DMA Base Register (DMABR) and the DMA Configuration Register (DMACR), for example.

Command Register

In one embodiment, the CR may control the overall operation of the device. To change state, and profiling mode a write may be performed on the CR.

TABLE 3.1.1

CR Description

| Bits | Contents |
|---|---|
| 31:30 | state |
| 29:28 | profile mode |
| — | unused |

TABLE 3.1.2

Encoded State Values

| State | 3-bit Value |
|---|---|
| IDLE | 00 |
| RUN | 01 |
| DMA WRITE | 10 |
| RESET | 11 |

TABLE 3.1.3

Encoded Profile Mode Values

| Profile Mode | 2-bit value |
|---|---|
| Write through | 00 |
| Trace profile | 01 |
| Range profile | 10 |

Status Register

In one embodiment, the SR may contain the current status of the device, such as including all parameters listed below in Table 3.1.4.

TABLE 3.1.4

SR Description

| Bits | Contents |
|---|---|
| 31:30 | state |
| 29:28 | previous state |
| 27:26 | profile mode |
| 25:23 | error |
| 22 | interrupt |
| — | unused |

DMA Base Register

The DMABR may simply contain the RAM base address for DMA operations.

TABLE 3.1.5

DMABR Description

| Bits | Contents |
|---|---|
| 31:0 | DMA Base Address |

DMA Configuration Register

The DMACR may allow for modification of the DMA transfer. Start and end address may be configured within ABACUS to limit the range to only a small block, or may be set for the whole device. In addition, the burst length of the transfer may be set for testing purposes.

TABLE 3.1.6

| Bits | Contents |
| --- | --- |
| 31:21 | ABACUS start DMA address |
| 20:10 | ABACUS end DMA address |
| 9:4 | Burst Length |
| — | unused |

State Machine

Figure 4:
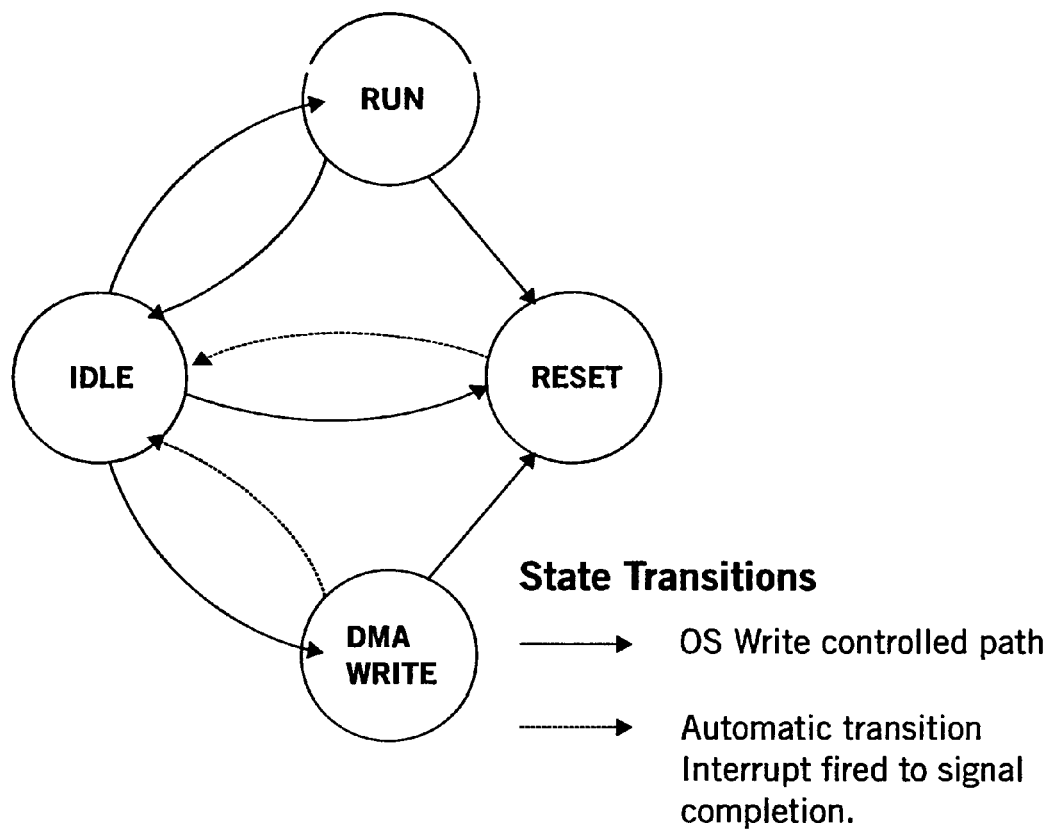
FIG. 4 illustrates an overview representation of the state types and state transitions for a controller of a configurable profiling core according to an embodiment of the present invention.

According to one embodiment, FIG. 4 illustrates an exemplary overview of the state types and state transitions for the controller (e.g. controller 115) of the configurable profiling core (e.g. configurable profiling core 100). In such an embodiment, function and allowed operation of each state according to one embodiment may be described below.

IDLE

Referring to FIGS. 1 and 4, in one embodiment as tested, the IDLE state may be the Controller 115's default state. IDLE state may be transitioned to after any interrupt. These interrupts may be used to indicate that an operation is complete or that an error has occurred. IDLE may also be transitioned to from the RUN state when a CR write asserts a transition to IDLE to stop profiling. The IDLE state may be the only state in which a single slave read can occur (with the exception of the Controller Configuration Registers). It may be also the only state where the profile mode can be changed. Another important purpose of the IDLE state may be for profiling configuration. During idle all configuration registers (addresses for Range Profiling, RAM table for Instruction Mix Profiling) may be read/written to.

Valid Operations:
    Transitioning to any state (RUN, DMA WRITE, RESET)
    Reading/Writing to the Controller Configuration Registers
    Reading/Writing the device 100's address space Invalid Operations:
    None

RUN

In one embodiment, while in the run state the device 100 may be profiling the traces received from the processor 120. The RUN state may transition back to the IDLE state when a CR write asserts a state change back to IDLE or an overflow occurs in the Program Counter (PC) counter (not shown). In the event that an invalid state is asserted by a CR write, an interrupt may be fired with an error code indicating an invalid operation was requested and the operation may be ignored. The RUN state may transition to the RESET state in the event that the RESET state is asserted. During RUN, the master enable signal for profiling registers may be set to high. See section entitled Shared Incrementer below and FIG. 5 for detail on how incrementing may be enabled during RUN at the profiling unit level.

Valid Operations:
    Transitioning to IDLE or RESET to stop the device from running
    Reading/Writing to the Controller Configuration Registers Invalid Operations:
    Transitioning to DMA CONFIG or DMA WRITE
    Reading counter values from the device (device must be in IDLE)
    Modifying the profile mode DMA Write According to an embodiment of the invention, CP core data may be written out to memory (e.g. memory 211 as shown in FIG. 2). The DMA Write mode may use one or more DMA registers to control where in system memory ABACUS 100 writes to as well as what portion of ABACUS 100's counter data may be written out and the transfer burst length, for example. In one embodiment, two DMA registers may be used.

Valid Operations:
    Transition to RESET
    Reading/Writing to the Controller Configuration Registers Invalid Operations:
    Transitioning to IDLE, RUN
    Reading counter values from the device (device must be in IDLE)
    Modifying the profile mode

RESET

In one embodiment, appropriate registers and output signals may be reset in one clock cycle. Immediately after RESET an interrupt may be asserted and the device 100 may transition to IDLE.

Interrupts

In such an embodiment, interrupts may occur under the following exemplary conditions:
    When a RESET has occurred
    When the PC has overflowed
    When a DMA WRITE has completed
    When a bus error has occurred during a DMA WRITE
    When an invalid command has been issued.

The interrupt bit of the SR may stay high until the interrupt has been serviced. The error code should be checked whenever an interrupt fires to ensure an error did not occur, as interrupts may be fired both on automatic state transitions and when errors occur. For an exemplary list of error types according to one embodiment, see Table 3.1.7. below.

TABLE 3.1.7

Encoded Error Values

| Profile Mode | 3-bit value |
| --- | --- |
| NONE | 000 |
| INVALID_COMMAND | 001 |
| UNABLE_TO_READ | 010 |
| COUNTER_OVERFLOW | 011 |
| DMA_TRANSFER_ERROR | 100 |

Profiling Units

Overview

According to one embodiment of the invention, all CP core profiling units 101 may share a common set of inputs and outputs and may share some operating characteristics. Every block may be fed a master write enable signal as well as the global read address. All read operations may be intended to occur in a single cycle for all units. All CP core units 101 may also have a counter output data which may be the width of the counter size (48 bits), for example.

TABLE 4.0.8

General Block Input Signals

| Signal | I/O | Type | Description |
| --- | --- | --- | --- |
| clk | I | STD_LOGIC | Global clock |
| resetn | I | STD_LOGIC | Global reset |
| write_en | I | STD_LOGIC | Counter enable |
| read_addr | I | STD_LOGIC_VECTOR (3 down to 0) | Block read address |

In one embodiment, most units 101 may not use the maximum 16 counters. In such an embodiment, not all reads to the device 100 may be valid. Any read to an unmapped location may give an unknown result.

Shared Incrementer 500

Figure 5:
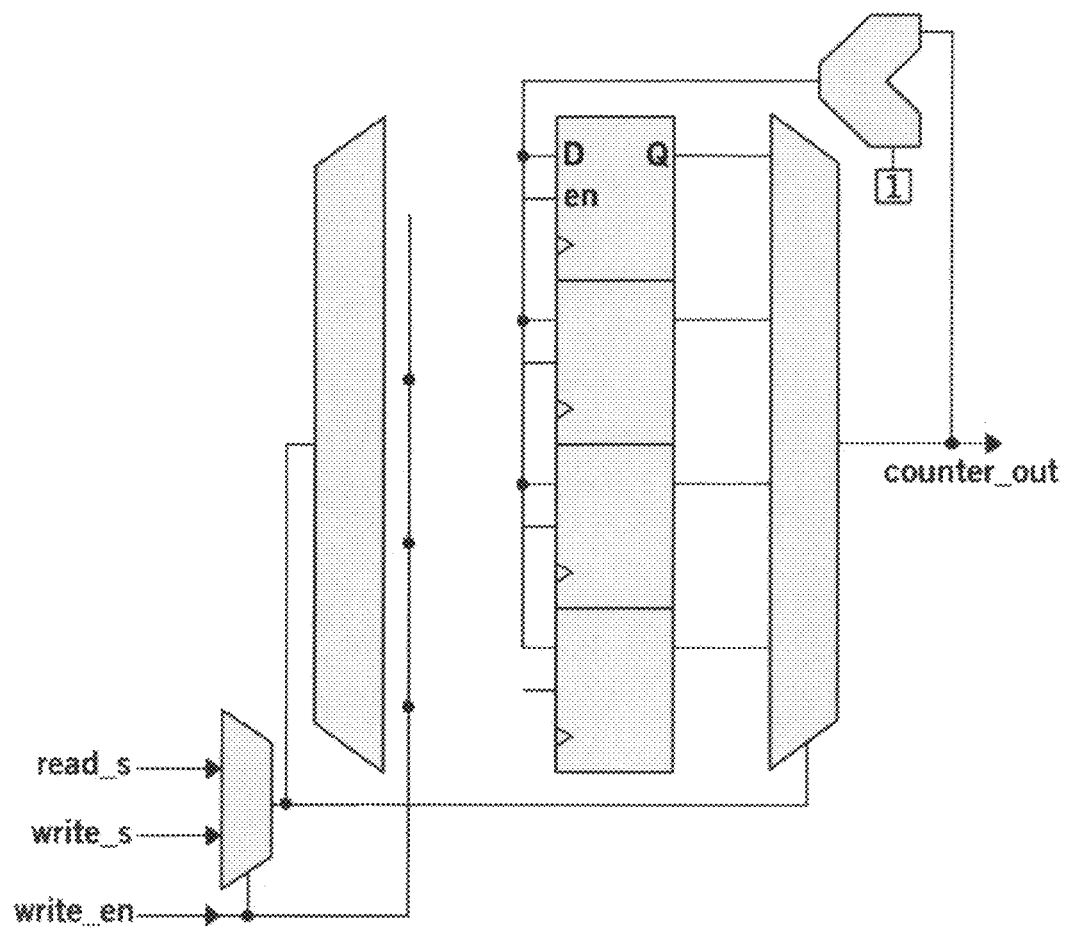
FIG. 5 illustrates a schematic representation of an exemplary shared incrementer (or counter) unit of a configurable profiling core according to an embodiment of the present invention.

According to one embodiment of the present invention, a Shared Incrementer block may be a basic building block for several of the CP core profiling units 101. An exemplary schematic of a shared incrementer 500 according to an embodiment of the present invention is shown in FIG. 5. It may consist of a bank of registers with width defined globally for the system, enable and read/write address controls, in one example. Its intended use may be for single-issue processors as it may only be able to increment a single counter per clock cycle, for example.

Run-time Parameters
  None
Non-Run-time Parameters
  Number of counters in one embodiment: 0 to 16

Dedicated Incrementer

According to another embodiment of the present invention, a Dedicated Incrementer may be the partner to a Shared Counter 500 for processors that are multi-issue. In such an embodiment, instead of a bank of registers and a single counter, each register may have its own incrementer and may be able to increment from 1 to issue width. Additionally the write address may become an array of addresses with length of issue width. In an exemplary testing embodiment, investigations into resource usage on an FPGA indicated that substantial area may be saved by selecting for dedicated incrementers rather than sharing several incrementers for multi-issue designs.

Run-time Parameters
  None
Non-Run-time Parameters
  Number of counters in one embodiment: 0 to 16
  Issue width in such embodiment: 1 to 4

Profile Control Unit

Referring to FIG. 1, according to a further embodiment of the invention, a Profile Control Unit 116 may be an additional layer of control over the CP core profile units 101. It may allow for the selective enabling of the CP core profile units 101 when the Program Counter is within the target range, for example. In such an embodiment, extra care may be taken when the Profile Control Unit 116 is used in conjunction with the Profile Unit 110 to ensure that the Profile Control Unit 116's range may desirably fully encompass all ranges in the Profile Unit 110, otherwise the Profile Unit 110 may not count as expected.

Run-time Parameters
  Mode of operation (Pass through, Trace, Range)
Non-Run-time Parameters
  None In a further embodiment, more details on the exemplary operation of the Trace and Range configuration options may be found below in the section entitled Profile Unit 110.

Instruction Mix Unit

Figure 6:
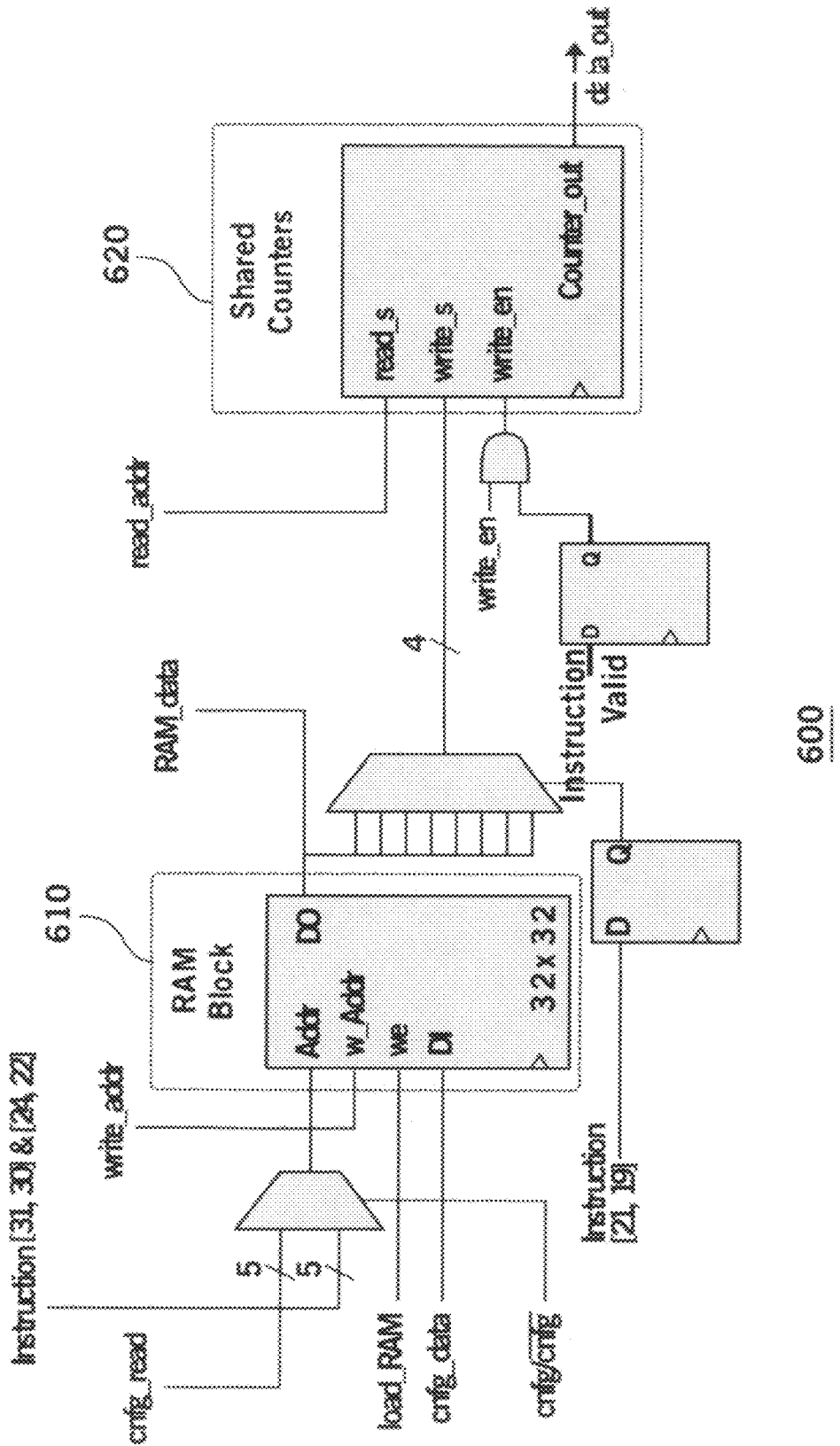
FIG. 6 illustrates a schematic representation of an exemplary instruction mix unit for a configurable profiling core according to an embodiment of the present invention.

According to an embodiment of the invention, an Instruction Mix Unit counts the number of instructions for pre-defined instruction types. A schematic representation of an exemplary instruction mix unit 600 (similar to instruction mix unit 112) for a CP core (e.g. CP core 100) according to an embodiment of the present invention is shown in FIG. 6. In such an embodiment, the Instruction Mix Unit 600 may comprise a RAM look-up table 610 to determine which counter to increment, and a Shared/Dedicated Incrementer 620. For additional inputs over the basic unit it may receive the instruction as well as an instruction valid signal.

Run-time Parameters
  Instruction mapping
Non-Run-time Parameters
  Number of counters in one embodiment: 0 to 16
  Instruction mapping (intialization)

Instruction Decoding

The instruction opcode may be used to address the RAM and the value stored for that opcode may be used to select a register to increment. In this way any instruction can map to any register, thus how the instructions may be grouped together may desirably be completely configurable.

SPARC™ Computer Processor ISA

Figure 7:
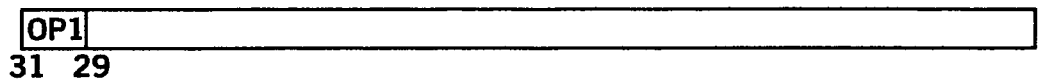
FIG. 7 illustrates an exemplary instruction set architecture showing exemplary instructions formats corresponding to a SPARC™ V8 computer processor system for a configurable profiling core according to an embodiment of the present invention.
Figure 7:
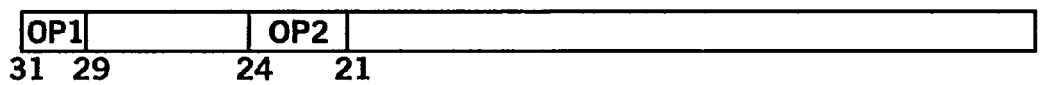
Figure 7:
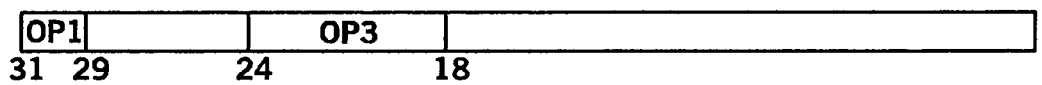

In one embodiment, the SPARC™ processor Instruction Set Architecture (ISA) may divide instructions into three different formats [2]. It may have a 2 bit opcode that defines the general type of instruction and then may define sub opcodes within those types such as to specify the specific instruction. An exemplary instruction set architecture 700 showing instruction formats corresponding to a SPARC™ V8 computer processor system for a configurable profiling core 100 according to an embodiment of the present invention is shown in FIG. 7, for example. To handle the variable op code size of the SPARC™ processor instruction set, in one embodiment, the op codes may be concatenated together to provide a single 8 bit opcode, which may need a 256×4 RAM block to contain all combinations, for example. For an embodiment comprising types with a smaller sub op code (branch instructions), all non op code bits within this range may desirably be supplied in all combinations to ensure proper counting of the instruction.

Memory Reuse Unit

Figure 8:
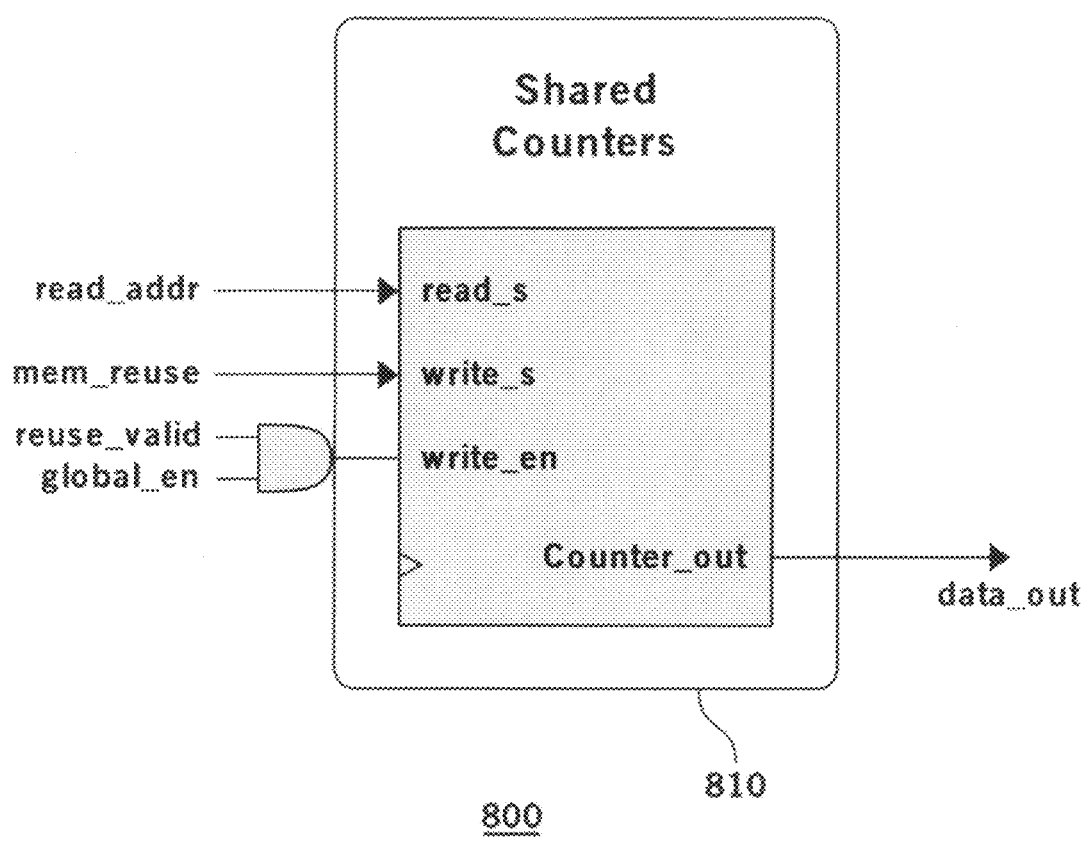
FIG. 8 illustrates a schematic representation of an exemplary memory reuse unit for a configurable profiling core according to an embodiment of the present invention.

In one embodiment, a Memory Reuse Unit may be designed to work with a set-associative cache that may have a Least Resently Used (LRU) stack. A schematic representation of an exemplary memory reuse unit 800 (similar to memory reuse unit 111) for a CP core (e.g. 100) according to an embodiment of the present invention is shown in FIG. 8. For any given cache access the reuse distance may be in the range [0; set_associativity−1] or a cache-miss, for a total number of set_associativity+1 bins, for example. For a given exemplary cache, this unit 800 may count the number of occurrences of each reuse distance as well as cache-misses. This may be one of the simplest blocks, it may primarily consist of a Shared Incrementer 810 and some additional logic for when to count, for example. It may receive the reuse distance (encoded) ("mem_reuse") which may comprise the write address to the counters 810 and a reuse valid signal ("reuse_valid") used to enable counting, for example.

Run-time Parameters
  None
Non-Run-time Parameters
  Support for 1 to 8 way set-associative caches according to one embodiment.

Reuse Distance

Figure 9:
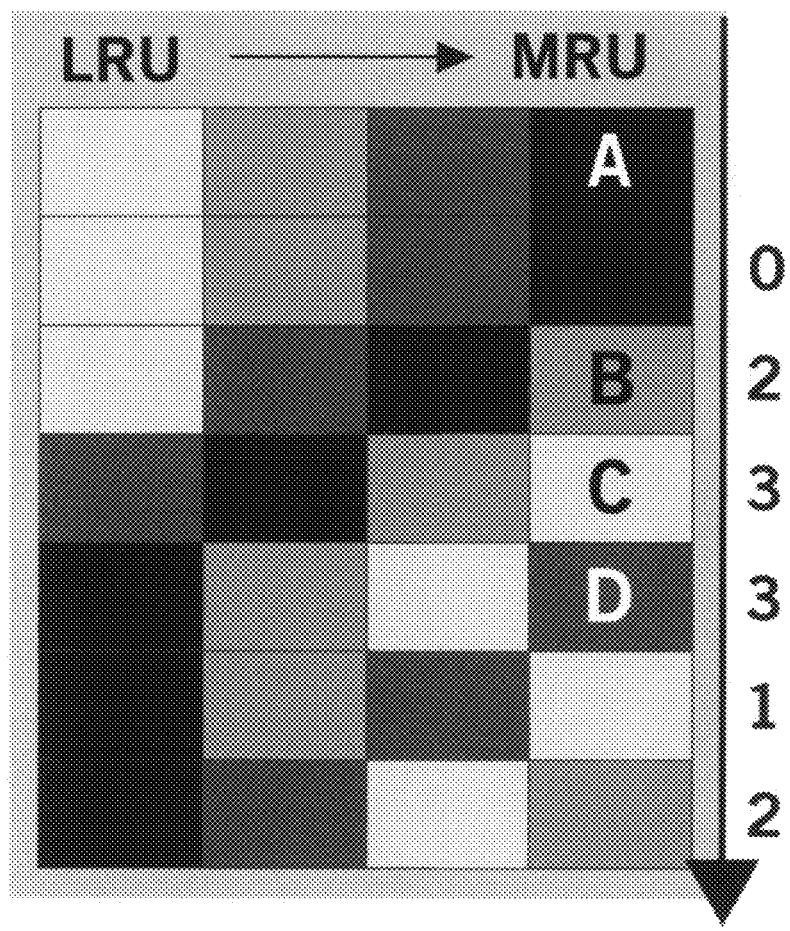
FIG. 9 illustrates a graphical representation of an exemplary 4-way set-associative cache reuse distance determination for implementation in a configurable profiling core according to an embodiment of the present invention.

For an exemplary set-associative cache, reuse distance may be defined as the change in LRU stack position within a set for a given cache access. In addition in one embodiment, the number of occurrences of cache misses may also be counted. FIG. 9 illustrates a graphical example of how the reuse distance may be determined from the LRU stack in an exemplary 4-way set-associative cache reuse distance scenario, as may be implemented in a CP core 100 of an embodiment of the present invention.

Profile Unit

Figure 10:
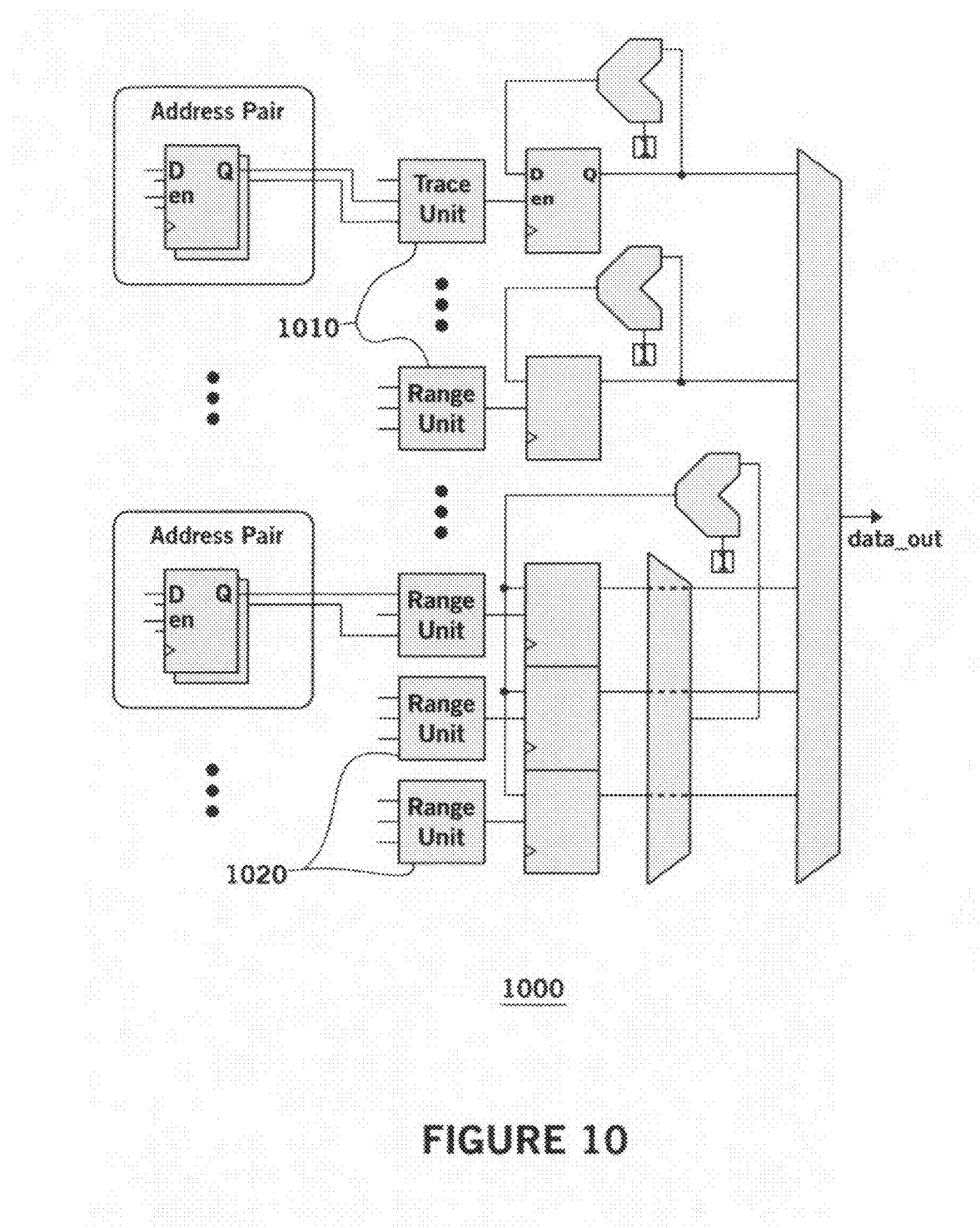
FIG. 10 illustrates a schematic representation of an exemplary profile unit for a configurable profiling core according to an embodiment of the present invention.

In an embodiment of the invention, a profile unit 110 may fill part of the role of a software profiler. A schematic representation of an exemplary profile unit 1000 (similar to profile unit 110) for a CP core (e.g. CP core 100) according to an embodiment of the present invention is shown in FIG. 10.

Figure 11A:
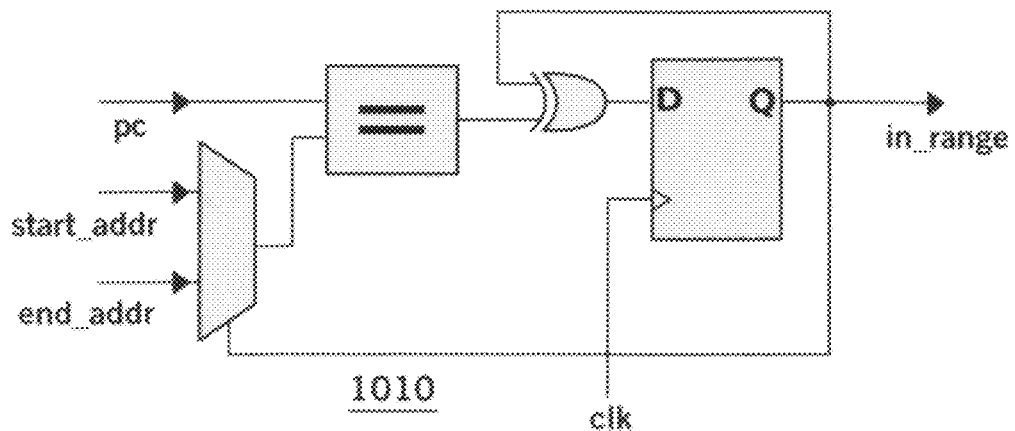
FIG. 11 illustrates schematic representations of (a) an exemplary trace sub-unit; and (b) an exemplary range sub-unit of a profile unit; for a CP core according to an embodiment of the present invention.
Figure 11B:
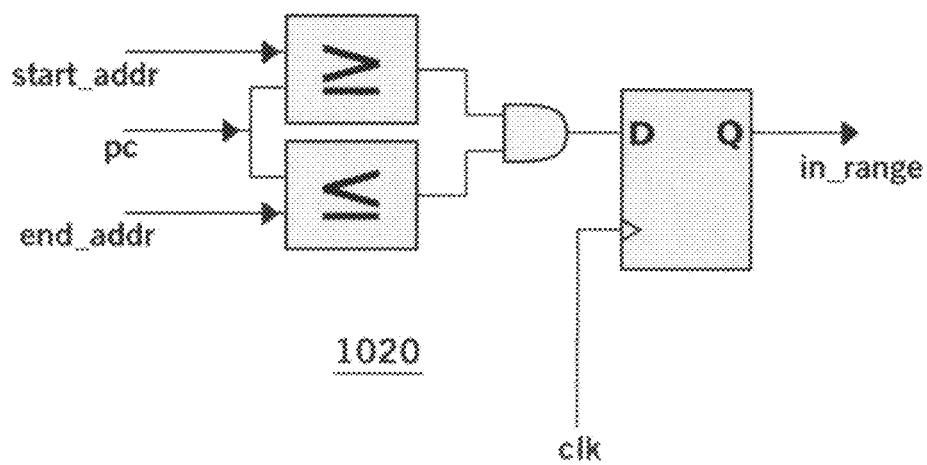
Figures 12A, 12B, 12C:
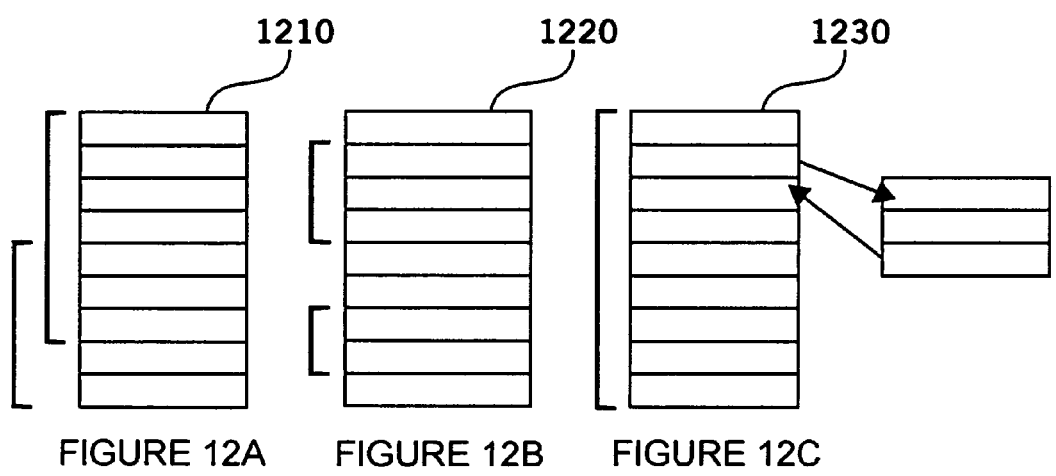
FIG. 12 illustrates a graphical representation of address ranges for range units, non-overlapping range units and trace units of a profile unit for a configurable profiling core according to an embodiment of the present invention.

Depending on how the profile unit 1000 is configured it may comprise registers counting the number of cycles spent within an address range or may count the number of cycles through an execution path starting and ending on given addresses. It may be comprised of two main types of sub-units, namely trace sub-units 1010 and range sub-units 1020. Schematic representations of an exemplary trace sub-unit 1010 and an exemplary range sub-unit 1020 of a profile unit 1000 for a CP core 100 according to an embodiment of the present invention are shown in FIGS. 11 (a) and (b), respectively. Trace units 1010 may have dedicated incrementers and allow for counting the number of cycles starting at a given address and ending at another. Range units 1020 may be of two different types, namely overlapping and non-overlapping range units. Overlapping range units may count the number of cycles in which the address is within a given address range and also may have dedicated incrementers, thus allowing them to overlap in address ranges. A third type may be non-overlapping range units which share a single incrementer and can not have overlapping address ranges. A graphical representation of address ranges for range units 1210, non-overlapping range units 1220 and trace units 1230 is shown in FIG. 12.

In one embodiment, in setting the ranges of the non-overlapping range units 1220 it may be important to ensure that they do not overlap. If the ranges overlap, counting may not work correctly and multiple non-overlap units 1220 could have the wrong result.

Run-time Parameters
    Counter range values
Non-Run-time Parameters
    Number of counters according to one embodiment: 0 to 16
        Divided between trace, address overlapping and non-overlapping range units.

Latency Unit

Figure 13:
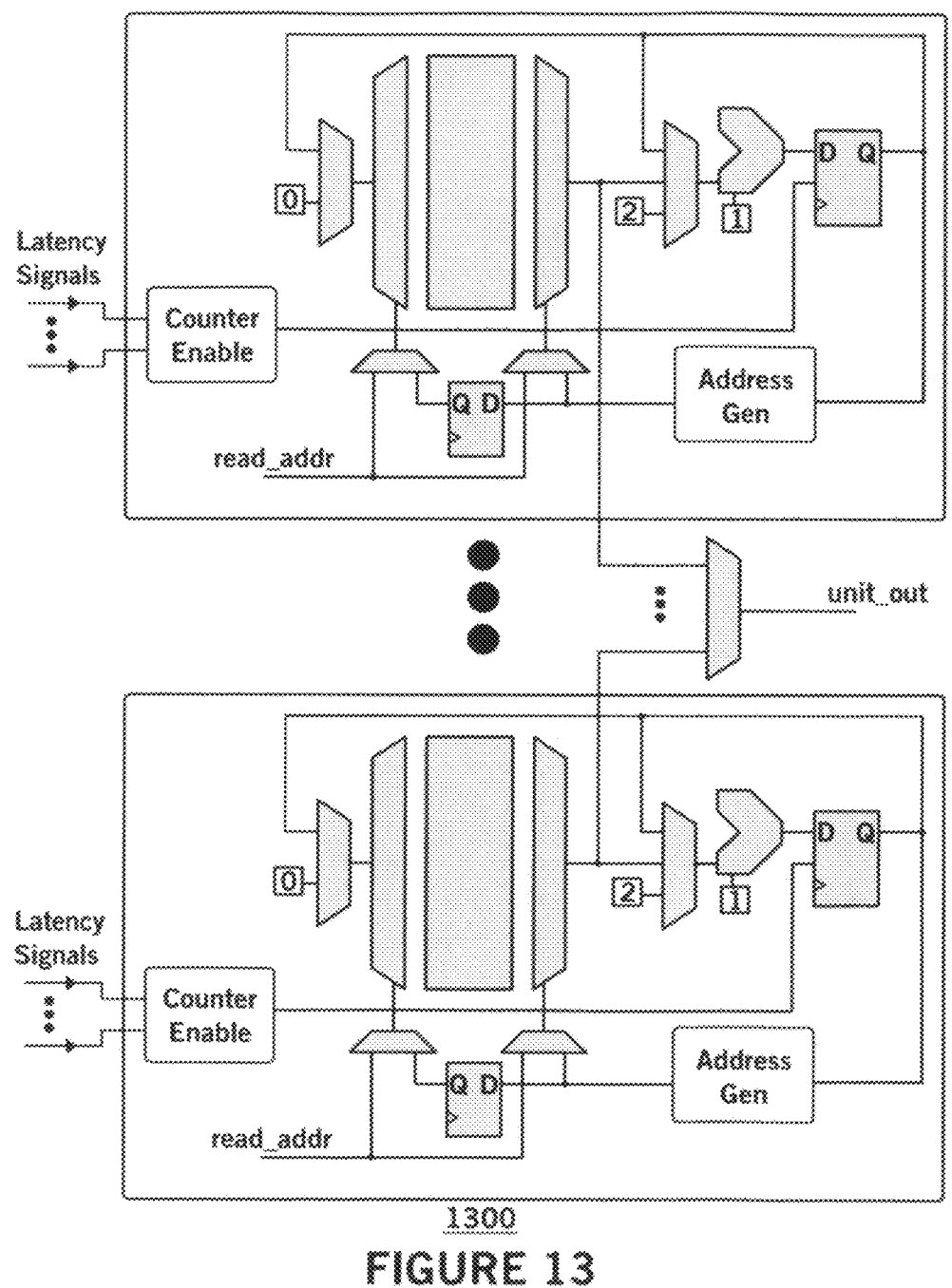
FIG. 13 illustrates a schematic representation of an exemplary latency unit for a configurable profiling core according to an embodiment of the present invention.

According to another embodiment, a Latency Unit 113 may comprise the function to help characterize the latency of a given type of event. A schematic representation of an exemplary latency unit 1300 (similar to latency unit 113) for a CP core (e.g. CP core 100) according to an embodiment of the present invention is shown in FIG. 13. A latency unit 1300 may perform such characterization of even latency by first breaking down the latency into its constituent parts as well as counting the total latency. For a memory access this may include bus contention and DRAM latency, for example. After each event has completed, the latency may be used to index a histogram and the count for that bin may be incremented by one. In this way a profile may be built for each latency component.

Run-Time Parameters
    None
Non-Run-Time Parameters
    Bin start and end sizes
    Number of latency signals
    Bin counter width In one embodiment, for each latency signal a basic block may be instantiated that will create the histogram for that particular latency component. Each such block may comprise a small RAM, a counter equal in size to the bin counter width and additional control logic, for example. The boundaries for bins may be constrained to be powers of 2 and the number of bins and the range they cover may be controlled by setting the bin start and end sizes. For example, a start bin size of 32 and end size of 128 may be expected to create the following configuration: [2, 32), [32, 64), [64, 128), [128, $2^{BIN\_COUNTER\_WIDTH}-1$]. Finally, in one embodiment, the width of the bins may be configurable with the default being 16 bits.

Misc Unit

According to a further embodiment, a Misc Unit 114 may comprise simple counts of some processor pipeline metrics, such as but not limited to: total instruction count register, unhalted cycles and halted cycles counters.

Run-Time Parameters
    None
Non-Run-Time Parameters
    None

Traces 119

In one embodiment, several metrics or traces 119 may be collected from the exemplary LEON3 processor 120 used in a test embodiment. In one aspect, the configuration of such metric collection may be runtime configurable. In such a case, code may be written for different desired possibilities and sections commented/uncommented to change functionality, for example.

Exemplary LEON3 Pipeline

The exemplary LEON3 used in one testing embodiment may comprise a 7 stage pipeline comprising: Fetch, Decode, Register Access, Execution, Memory, Exception, Write Back, for example.

Exemplary Traced Signals
    PC (exception stage)
    Instruction (exception stage)
    Instruction Valid (exception stage)
    Unhalted Cycle (exception stage)
    Instruction Cache Reuse Distance
    Instruction Cache Reuse Distance Valid
    Data Cache Reuse Distance
    Data Cache Reuse Distance Valid
    Data Cache Latency Holds Further definitions according to one embodiment:

Program Counter The program counter sampled from the exception stage.

Instruction: The instruction may be the instruction from a given stage in the processor pipeline. Currently this is the exception stage of the pipeline.

Instruction Valid A signal to indicate the value on the instruction trace is valid. The instruction may be considered valid under a set of conditions, such as the following exemplary conditions:
    Processor not halted
    Not the 2nd or greater cycle for a multi cycle execution instruction
    Processor not in debug mode
    Instruction not annulled
    Instruction does not trap Unhalted Cycle: May comprise a signal that may be asserted whenever the processor is not stalled on such things as fetching instruction/data from memory.

Instruction Cache Reuse Distance: The reuse distance from the instruction cache.

Instruction Cache Reuse Distance Valid: Asserted when the instruction cache is read by the processor.

Data Cache Reuse Distance: The reuse distance from the data cache.

Data Cache Reuse Distance Valid: Asserted when the data cache is read/written to by the processor.

Data Cache Latency Holds: The collection of latency signals from the data cache, bus and DRAM controller.

The above description of exemplary embodiments of the present invention, including what is described in references identified below, is not intended to be exhaustive or to limit the embodiments of the invention to the precise forms disclosed herein. Although specific embodiments and examples are described herein for illustrative purposes and to allow others skilled in the art to comprehend their teachings, various equivalent modifications may be made without departing from the scope of the disclosure, as will be recognized by those skilled in the relevant art. Accordingly, the scope of the invention is to be construed in accordance with the substance defined by the following claims.

References Noted in the Above Description which are Herein Incorporated in their Entirety As Though they Formed Part of the Present Description:
[1] Xilinx, Inc., Xilinx UG069 XUP Virtex-II Pro Development System, Hardware Reference Manual.
The SPARC™ Architecture Manual Version 8.
[3] GRUB IP Core User's Manual.
[4] GRUB IP Library User's Manual.

The invention claimed is:

1. A computer system comprising at least one non-configurable hard processor with at least one non-configurable hard processor core, said computer system further comprising at least one discrete profiling core separate from said at least one non-configurable hard processor, wherein said at least one discrete profiling core comprises:
at least one processor interface module operable to receive processing signals from at least one said non-configurable hard processor core; and
at least one profiling module operable to analyze at least a portion of said processing signals to profile at least one processing performance measure; and wherein said at least one discrete profiling core is operable to be configured during operation.

2. The computer system according to claim 1 wherein said at least one processor interface module comprises at least one of connectors and virtual probes operable to interface with and receive processing signals from said at least one non-configurable hard processor core.

3. The computer system according to claim 1 additionally comprising at least one system bus, and wherein said at least one processor interface module additionally comprises at least one bus interface for communication between said discrete profiling core and at least one of said system bus and a system memory.

4. The computer system according to claim 3 wherein said at least one discrete profiling core additionally comprises at least one operating system interface operable to interface with at least one of an operating system program and an application program running on said computer system, and wherein said discrete profiling core is additionally operable to report at least one said processing performance measure to at least one of said operating system and said application program via said operating system interface.

5. The computer system according to claim 4, wherein said at least one discrete profiling core is further operable to be dynamically re-configured during operation by at least one of said operating system program and said application program via said operating system interface to re-configure at least one of said processing performance measure and said received processing signals.

6. The computer system according to claim 3, wherein said at least one discrete profiling core additionally comprises at least one profiling memory operable to store at least one of a processing performance measure and processing signals, and wherein said at least one profiling memory is operable to interface with at least one of said system memory and said system bus via a direct memory access protocol.

7. The computer system according to claim 1, wherein said profiling module comprises at least one profiling unit; and wherein each of which said profiling unit is operable to profile at least one said processing performance measure.

8. The computer system according to claim 7 wherein said at least one profiling unit comprises one or more of: a profile unit, a memory reuse unit, an instruction mix unit, a latency unit, a data latency unit, a stall time unit, a data access histogram unit and a miscellaneous counter unit.

9. The computer system according to claim 1 wherein said at least one processing performance measure comprises a measure of one or more of: an instruction mix, code segment execution time, cache access pattern, multicore cache sharing, cache stack distance profile, stall time, latency, data latency, data access histogram, power consumption and cache coherency traffic.

10. The computer system according to claim 1 wherein said at least one discrete profiling core additionally comprises at least one profiling memory operable to store at least one of a processing performance measure and processing signals.

11. The computer system according to claim 1 wherein said at least one non-configurable hard processor comprises at least two or more non-configurable hard processing cores.

12. The computer system according to claim 1 wherein said at least one discrete profiling core additionally comprises a profiling core controller module.

13. A configurable profiling core for use in a computer system comprising at least one non-configurable hard processor separate from said configurable profiling core and having at least one non-configurable hard processor core, said configurable profiling core comprising:
at least one processor interface module operable to receive processing signals from at least one said non-configurable hard processor core; and
at least one profiling module operable to analyze at least a portion of said processing signals to profile at least one processing performance measure;
wherein said configurable profiling core is discrete from said at least one processor, and is further operable to be configured during operation.

14. The configurable profiling core according to claim 13 wherein said at least one processor interface module comprises at least one of connectors and virtual probes operable to interface with and receive processing signals from said at least one non-configurable hard processor core.

15. The configurable profiling core according to claim 13 additionally comprising at least one bus interface for communication between said configurable profiling core and at least one of a system bus connected to said at least one non-configurable hard processor of said computer system, an external interface, and a system memory.

16. The configurable profiling core according to claim 15 additionally comprising at least one operating system interface operable to interface with at least one of an operating system program and an application program running on said computer system, and wherein said configurable profiling core is additionally operable to report at least one said processing performance measure to at least one of said operating system and said application program via said operating system interface.

17. The configurable profiling core according to claim 16, wherein said at least one configurable profiling core is further operable to be dynamically re-configured during operation by at least one of said operating system program and said application program via said operating system interface to re-configure at least one of said processing performance measure and said received processing signals.

18. The configurable profiling core according to claim 15, additionally comprising at least one profiling memory operable to store at least one of a processing performance measure and processing signals, and wherein said at least one profiling memory is operable to interface with at least one of said system memory, said external interface, and said system bus via a direct memory access protocol.

19. The configurable profiling core according to claim 13, wherein said profiling module comprises at least one profiling unit, and wherein each of which said profiling unit is operable to profile at least one said processing performance measure.

20. The configurable profiling core according to claim 19 wherein said at least one profiling unit comprises one or more of: a profile unit, a memory reuse unit, an instruction mix unit, a latency unit a data latency unit, a stall time unit, a data access histogram unit and a miscellaneous counter unit.

21. The configurable profiling core according to claim 13 wherein said at least one processing performance measure comprises a measure of one or more of: an instruction mix, code segment execution time, cache access pattern, multicore cache sharing, cache stack distance profile, stall time, latency, data latency, data access histogram, power consumption and cache coherency traffic.

22. The configurable profiling core according to claim 13 additionally comprising at least one profiling memory operable to store at least one of a processing performance measure and processing signals.

23. The configurable profiling core according to claim 13 wherein said at least one non-configurable hard processor comprises at least two or more non-configurable hard processing cores.

24. The configurable profiling core according to claim 13 additionally comprising a profiling core controller module.

* * * * *